Aug. 25, 1942.  E. A. CALABRO  2,294,159

METHOD OF LAMINATING POROUS AND PLASTIC MATERIALS

Filed July 31, 1940

INVENTOR
Ernest A. Calabro
BY
Donald R. Brown
ATTORNEY

Patented Aug. 25, 1942

2,294,159

UNITED STATES PATENT OFFICE 2,294,159

METHOD OF LAMINATING POROUS AND PLASTIC MATERIALS

Ernest A. Calabro, Boston, Mass., assignor to Polaroid Corporation, Dover, Del., a corporation of Delaware Application July 31, 1940, Serial No. 348,931

2 Claims. (Cl. 154—2)

This invention relates to laminating and adhesives therefor, and more particularly to new methods and materials for forming a laminated product comprising a plastic material and a fibrous material.

It is a particular object of the invention to provide new means for bringing about a strong, adhesive bond between a sheet of plastic material, and more particularly a sheet of a cellulose ester such, for example, as cellulose acetate or cellulose nitrate, and a porous, fibrous material such as paper, cardboard or wood.

Another object of the invention is to provide a new method of laminating or bonding such materials which will be both simple and inexpensive, and which at the same time will provide a strong and relatively permanent bond.

A further object is to provide a new method for bonding a viewing window, for example, a sheet of transparent plastic such as a cellulose ester containing polarizing particles, to a holder of paper or cardboard, and particularly to bond such sheets at their contacting edges only.

A still further object is to provide, as a new article of manufacture, a viewing device comprising a paper or cardboard element provided with suitable apertures adapted to coincide with the eyes of the user and having transparent elements, comprising a suspension of polarizing particles in a plastic suspending medium of the above type, fitted over said apertures, and bonded at their edges to said paper.

Figure 1:
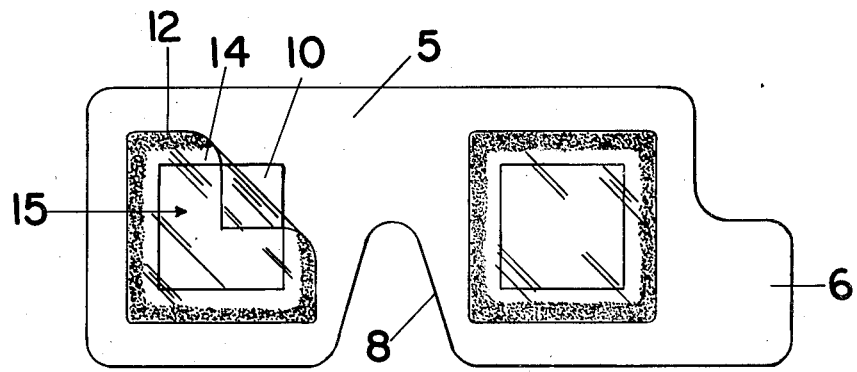
Figure 2:
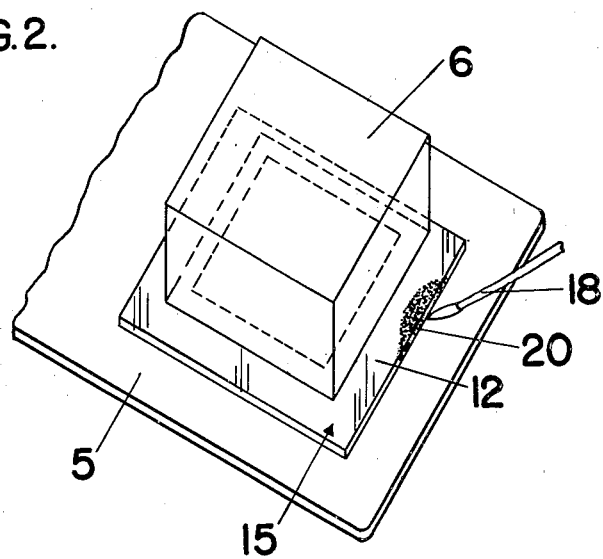

Other objects and advantages will in part appear and in part be pointed out in the course of the following detailed description of one embodiment of the invention, which is given, as a non-limiting example, in connection with the accompanying drawing, in which:

Figure 1 is a view showing one side of a viewing device having transparent plastic elements bonded thereto in accordance with the present invention; and Figure 2 is a somewhat diagrammatic view, in perspective, showing simple apparatus for practicing the process of the invention to produce a viewing device such as that shown in Fig. 1.

The device shown in Fig. 1 represents a viewing device such as may be used for viewing three-dimensional pictures comprising a pair of superimposed images. It comprises a main body portion 5 with a holding tab 6 and a cut-out portion 8 adapted to fit over the nose of the user, and it may conveniently be made from a porous, fibrous material such as paper or cardboard. In the body portion 5 is a pair of apertures 10 so spaced that one will be opposite each eye of the user. Mounted on body 5 over each of apertures 10 is a transparent element 15 which may conveniently comprise a sheet of plastic material such as any cellulose ester. In a preferred form of the invention, elements 15 may comprise sheets of a suspension of minute, oriented, polarizing articles in a suspending medium such as cellulose acetate or cellulose nitrate, for example, the material sold under the trade name "Polaroid."

Elements 15 may preferably be positioned with their polarizing axes at right angles to each other, and the device may conveniently be used for viewing stereoscopic pictures comprising superimposed dichroic images having their polarizing axes relatively perpendicular. It will be noted that elements 15 overlap apertures 10 and that the outer part 12 of the overlapping portion is shown as bonded to element 5. It is with a method of producing such a bond that this invention is primarily concerned. Said bonded portion may extend to the edge of aperture 10, or there may be an unbonded portion 14.

Figure 2 illustrates somewhat diagrammatically a convenient manner of practicing the process of the invention to secure the above bond. Element 15 is first superimposed on element 5 and is positioned thereon to cover aperture 10 and to overlap it on all sides. A pressure or holding element 16 is then placed on element 15 to hold it in place during the bonding process. Element 16 may be of any convenient shape and of any desired material, such, for example, as a rectangular block of metal or wood, and the bottom side thereof should be smaller in area than element 15 so as to leave portion 12 thereof uncovered, as shown in Fig. 2. Any other convenient means or device may be similarly used for thus applying pressure within the periphery of the smaller element.

The next step is to apply the adhesive material to the bottom side of element 15, that is, the side adjacent element 15.

In accordance with the practice of the invention, the adhesive comprises a material which is a solvent for the material of element 15. If, for example, element 15 comprises a sheet of cellulose acetate, or cellulose nitrate, excellent results may be obtained by using an organic solvent such as acetone. The latter need only be applied at the junction between the edges of sheet 15 and element 5, and as shown in Fig. 2, this may conveniently be done by touching said junction along each side of sheet 15 with a brush or tube 18 dipped in the solvent. Said solvent will then be drawn by capillary action into contact with portion 12, as is indicated by shaded portion 20, and will act to dissolve the material of sheet 15 slightly and make it adhere strongly to the fibrous material of element 5.

During the foregoing step of the process sufficient pressure should be maintained on or by the element 16 to keep the two materials in close contact, in order both to aid the bonding and to prevent undue spreading of the solvent, which latter will normally spread only so far as the point or points where pressure is applied, leaving unbonded the portion 14 indicated in Fig. 1. The bond is completed as soon as the solvent either evaporates, as in the case of a volatile solvent such as acetone, or is otherwise dissipated as by absorption in the porous material of element 5, which in either case will be a matter of only a few seconds.

There are other solvents in addition to acetate which can be used equally well in the practice of the invention. Particularly good results can be obtained from the use of a solution of ethyl acetate and methanol. The proportions of these two components may be varied within a wide range, the main requirement being that sufficient of the methanol be present to insure the solvent powers of the solution. Satisfactory results may be obtained with as low as 10% and as high as 40% methanol by volume of the total volume of solution, and a preferred solution comprises 25% methanol and 75% ethyl acetate.

Since certain changes may be made in carrying out the above process without departing from the scope of the invention, it is intended that all matter contained in the above description shall be interpreted as illustrative and not in a limiting sense.

It is also to be understood that the following claims are intended to cover all generic and specific features of the invention herein described, and all statements of the scope of the invention which, as a matter of language, might be said to fall therebetween.

Having described my invention, what I claim as new and desire to secure by Letters Patent is:

1. The method of bonding sheet cellulosic, plastic materials to porous, fibrous materials, which comprises mounting a sheet of said plastic and a sheet of said fibrous material in superimposed relation, one of said sheets being smaller in area than the other, moistening the junction of said sheets with an organic solvent for said plastic while exerting pressure on said sheets at an area within the periphery of the smaller thereof sufficient to maintain said sheets in close contact and to prevent said solvent from spreading beyond the area at which said pressure is exerted, and maintaining said pressure until said solvent has dissipated.

2. In a method of bonding to porous, fibrous materials sheet plastic materials of the class consisting of cellulose acetate and cellulose nitrate which contain oriented polarizing particles, the steps which comprise mounting a sheet of said plastic and a sheet of said fibrous material in superimposed relation, said plastic sheet being smaller in area than said second named sheet, exerting pressure thereon at an area within the periphery of said plastic sheet sufficient to maintain said sheets in close contact, moistening the junction of said sheets with an organic solvent for said plastic while maintaining said pressure to a sufficient degree to prevent said solvent from spreading beyond the area where said pressure is exerted, and maintaining said pressure until said solvent has dissipated.

ERNEST A. CALABRO.

CERTIFICATE OF CORRECTION.

Patent No. 2,294,159.                                         August 25, 1942.
                        ERNEST A. CALABRO.

It is hereby certified that error appears in the printed specification of the above numbered patent requiring correction as follows: Page 1, second column, line 8, for "articles" read --particles--; page 2, first column, line 20, for "acetate" read --acetone--; and that the said Letters Patent should be read with this correction therein that the same may conform to the record of the case in the Patent Office.

Signed and sealed this 6th day of April, A. D. 1943.

(Seal)
                                          Henry Van Arsdale,
                                       Acting Commissioner of Patents.